United States Patent [19]

Jablon et al.

[11] Patent Number: 5,421,006
[45] Date of Patent: May 30, 1995

[54] METHOD AND APPARATUS FOR ASSESSING INTEGRITY OF COMPUTER SYSTEM SOFTWARE

[75] Inventors: David P. Jablon; Nora E. Hanley, both of Shrewsbury, Mass.

[73] Assignee: Compaq Computer Corp., Houston, Tex.

[21] Appl. No.: 231,443

[22] Filed: Apr. 20, 1994

Related U.S. Application Data

[63] Continuation of Ser. No. 880,050, May 7, 1992.

[51] Int. Cl.⁶ .................... G06F 11/00; H04K 1/00
[52] U.S. Cl. ........................................ 395/575; 380/4
[58] Field of Search ............ 395/575, 700, 750, 425; 380/4

[56] References Cited

U.S. PATENT DOCUMENTS

| | | | |
|---|---|---|---|
| 4,309,569 | 1/1982 | Merkle . | |
| 4,388,695 | 6/1983 | Heinemann | 364/900 |
| 4,590,552 | 5/1986 | Guttag . | |
| 4,651,323 | 3/1987 | Goodman et al. | 364/900 |
| 4,661,991 | 4/1987 | Logemann . | |
| 4,685,056 | 8/1987 | Barnsdale, Jr. et al. | 364/200 |
| 4,698,750 | 10/1987 | Wilkie et al. | 364/200 |
| 4,747,040 | 5/1988 | Blanset et al. | 364/200 |
| 4,819,267 | 4/1989 | Cargile et al. | 380/23 |
| 4,825,358 | 4/1989 | Letwin et al. | 364/200 |
| 4,885,788 | 12/1989 | Takaragi et al. | 380/23 |
| 4,908,861 | 3/1990 | Brachtl et al. | 380/25 |
| 4,930,073 | 5/1990 | Cina | 364/300 |
| 4,970,504 | 11/1990 | Chen . | |
| 4,975,950 | 12/1990 | Lentz | 380/4 |
| 5,022,077 | 6/1991 | Bealkowski et al. | 380/4 |
| 5,050,212 | 9/1991 | Dyson | 380/25 |
| 5,073,934 | 12/1991 | Matyas et al. | 380/30 |
| 5,121,345 | 6/1992 | Lentz | 364/550 |
| 5,138,706 | 8/1992 | Melo et al. . | |
| 5,144,659 | 9/1992 | Jones | 380/4 |
| 5,161,122 | 11/1992 | Robertson | 365/195 |
| 5,175,840 | 12/1992 | Sawase et al. | 395/425 |
| 5,204,966 | 4/1993 | Wittenberg et al. | 395/800 |
| 5,265,164 | 11/1993 | Matyas et al. | 380/30 |
| 5,278,973 | 1/1994 | O'Brien et al. | 395/500 |

OTHER PUBLICATIONS

Intel 386 SL Microprocessor SuperSet Programmer's Reference manual, 1990, ISBN 1-55512-129-2.
Compaq Computer Corporation, Security Standard for Hardware Configuration, pp. 1-6, 1990.
Flowchart of Operations of Computers According to the Security Standard for Hardware Configuraiton.
Chap. 13, Real Time Clock Interface, 386 SL Microprocessor Superset System Design Guide by Intel Corporation, pp. 13-1 to 13-2, 1990.
Using Password Security, Operations Guide for Compaq Deskpro 386s Personal Computer by Compaq Computer Corp., pp. 3-5 to 3-7, 1988.

Primary Examiner—Robert W. Beausoliel, Jr.
Assistant Examiner—Joseph E. Palys
Attorney, Agent, or Firm—Pravel, Hewitt, Kimball & Krieger

[57] ABSTRACT

A method and device for reliably assessing the integrity of a computer system's software prevents execution of corrupted programs at time of system initialization, enhancing system security. Programs and data comprising the system's trusted software, including all startup processes, are verified before being utilized. Methods to verify the trusted software use a hierarchy of both modification detection codes and public-key digital signature codes. The top-level codes are placed in a protectable non-volatile storage area, and are used by the startup program to verify the integrity of subsequent programs. A trusted initialization program sets a hardware latch to protect the codes in the non-volatile memory from being overwritten by subsequent untrusted programs. The latch is only reset at system restart, when control returns to the bootstrap program. Software reconfiguration is possible with trusted programs that write new top-level codes while the latch is open. The mechanism itself is immune to malicious software attack when the write-protect latch is closed before running untrusted software. Preferred embodiments in an IBM-compatible personal computer uses the reset switch to initiate a trusted path between the user and a program. Damage from certain classes of computer virus and trojan horse attacks is prevented. A system recovery process is described. A related improved method for user authentication uses a read-and -write memory protection latch to prevent access to sensitive authentication data.

19 Claims, 8 Drawing Sheets

A SECURE CONFIGURATION:

| VARIABLE | VALUE | |
|---|---|---|
| COMPATIBLE | FALSE | 110 |
| USER ENABLED | TRUE | 111 |
| USER CODE | A6339DE4DBE72231 | 112 |
| CONFIG ENABLED | TRUE | 113 |
| CONFIG CODE | 15088428267F00BA | 114 |

COMPATIBLE CONFIGURATION:

| VARIABLE | VALUE | |
|---|---|---|
| COMPATIBLE | TRUE | 120 |
| USER ENABLED | UNDEFINED | 121 |
| USER CODE | UNDEFINED | 122 |
| CONFIG ENABLED | UNDEFINED | 123 |
| CONFIG CODE | UNDEFINED | 124 |

METHOD AND APPARATUS FOR ASSESSING INTEGRITY OF COMPUTER SYSTEM SOFTWARE

This is a continuation of co-pending application Ser. No. 07/880,050 filed on May 7, 1992.

BACKGROUND

1. Field of the Invention

This invention relates to an improved method and device for assessing the integrity of computer software during the system initialization process, and preventing incorrect programs from executing. Preferred embodiments of this invention relate to an improved user authentication method, and generally improved computer system security. The invention is useful for preventing damage from certain computer virus and Trojan horse attacks.

2. Background Discussion

The field of computer security spans many interrelated areas, addressing many different problems. Defensive security protective measures can often be quite complex, and in complex systems, an attacker can exploit a "weak link" in the system to circumvent the protective measures. The security of one aspect of the system can thus depend on the strength of protection provided in other areas. This invention primarily assesses software integrity at startup time, and it is intended to enhance rather than replace other security methods. Since it can compensate for other security weaknesses of the system, the resulting benefits go beyond integrity assessment to improve user authentication and other security functions.

As this invention provides the greatest benefit in personal computer systems, the IBM-compatible personal computer (herein after referred to simply as the "PC") running the DOS operating system will be used as an example for much of this discussion. But the same benefits can be realized in other computer operating systems and hardware, and appropriately modified implementations will be apparent to those skilled in the art.

As this invention is related to the fields of software protection, software integrity assessment, cryptography, memory protection, and user authentication, we will discuss relevant prior art in each of these areas. The invention includes a unique application of prior art in cryptography and integrity assessment. To clarify the relationship between the relevant fields, we first define some concepts in computer security as used herein, including "trusted software", software "integrity" and software "protection". We will also review some specific security threats including "Trojan horse" and "software virus" attacks, and review the prior art in addressing these threats, distinguishing between protection methods and integrity assessment methods, and describing the useful concept of a "trusted path".

"Trusted software", as used here, is defined to be the subset of all the software used in a system, which is responsible for the correct and reliable operation of the system, and responsible for enforcing a system's security policy. The security policy may include rules for how to authorize access to the system, and rules for determining who can access particular data within the system. The "trust" here is an abstract relative measure. The determination of which software is trusted, and the functions which it is trusted to perform, can vary widely from system to system. Our usage of the term "trusted software" is closely related to the usage in standard computer security literature, including the U.S. Department of Defense Trusted Computer System Evaluation Criteria (TCSEC). In this literature, the term "trusted computing base" is often used, which is comprised of the trusted software, plus any supporting hardware.

Software "integrity", as used in this discussion, refers to whether the software is as trustworthy as when it was initially installed. We assume that the system is in its most reliable state immediately after a proper installation. System software that has been changed, whether through a deliberate act by unauthorized person, or through an accidental system malfunction, is said to have undergone an "integrity violation". In such cases, the software should no longer be presumed to operate correctly. Maintaining the integrity of the trusted software is especially important. "Integrity assessment" is the art of determining whether a system's integrity is intact or has been violated. The "trusted software" referred to throughout this discussion is generally trusted at least to not violate the integrity of other parts of the system.

We now introduce an extension to the concept of trusted software, to be called "transient trusted software". This concept applies to systems that startup in a highly trusted state and degrade over time. At a certain point in the operation of a system, the set of trusted software may become vulnerable to attack, and can no longer be relied upon to perform trusted operations. When the system is restarted, integrity assessment measures can be used to revalidate the transient trusted software. In the rest of this document, our use of "trusted software" will generally refer to this "transient trusted software".

Software "protection" is defined here as the art of preventing violations of software integrity. Although this invention is primarily an integrity assessment method, rather than a software protection method, a review of some protection methods will help frame the invention in the context of prior art. The discussion will show how software protection methods in actual use are less than perfect, and how a stronger layer of integrity assessment is needed. (The field of software "protection" should not be confused with the field of software "copy-protection", which addresses the problem of software theft.)

One general class of threat to system security is a "Trojan horse" attack. This is a program that is designed or has been modified to perform some hostile act, but is disguised as a familiar or non-threatening program, or it may be hidden within trusted system programs.

Another general class of security threat is the "software virus". These are hostile software programs, often introduced into systems using a Trojan horse method, with the additional ability to replicate by attaching copies of themselves into other modified programs. These attacks first violate the integrity of software, and then perform a hostile action at a later time.

Whereas the wide-spread threat from software viruses is a relatively new phenomenon, historically, much attention in the computer security field has focused on methods to protect computer system integrity while allowing untrusted programs to run. The field of software protection has generated many mechanisms for securing access to software and data within a system. Multi-ring architectures were designed both to segregate user processes from each other in multi-user time sharing systems, and to protect trusted operating systems from less-trusted applications. In these systems, special hardware and software mechanisms segregate the software address space into two or more protection "rings". The innermost ring contains the system's most-trusted software, and can enforce some of the security policy even in the face of failures of software in outer rings. A good background discussion of protection rings, and a description of an advanced multi-ring architecture can be found in U.S. Pat. No. 4,787,031.

However, despite the architectural strength of some systems, in actual use, the integrity of trusted software cannot always be guaranteed. In the UNIX operating system, which uses a two-ring architecture, there is a facility for "root" access for processes running in the less-privileged outer ring. With root access, much of the architectural surrounding the inner ring can be bypassed, and any user or process running as root can modify any trusted software. In theory, root access is only used for special security-sensitive operations, but in practice, preventing unauthorized root access is a well-known security problem of the system.

In IBM-compatible PC system running DOS, which uses the processor's ringless "real" addressing mode, the problem is much worse. There is no architectural constraint preventing any application from corrupting the rest of the system software. Since all DOS programs have access to the same address space as DOS itself, all writable storage areas of the machine are vulnerable to attack. This problem remains even in PC operating systems that switch between real and protected addressing modes of the Intel 386 family of microprocessors, which is discussed in U.S. Pat. No. 4,825,358. (This patent is also cited below in the discussion of prior art in memory-protection devices.) Since such systems generally still provide access to real mode, and for other compatibility reasons, there is always a back-door for bypassing the security features set up in protected mode.

The threat of very sophisticated deliberate attacks against system security has also become a common problem. There is much literature about the problem of PC viruses, and many products have been designed to mitigate their threat. A particularly troublesome form of virus attack is one that is carefully designed to bypass normal system security features. And though there may be no deliberate attempt to infect a given system, there is still a high risk of inadvertent infection.

Because PC DOS systems have no solid memory protection architecture, all writable storage areas of the machine are thus vulnerable to attack. Some examples of vulnerable areas in a PC include the following:
a writable hard disk;
a removable disk, where unauthorized substitution of, or access to the disk is possible;
an inadequately protected storage area on a network server that contains a program to be downloaded to a PC;
a PC which loads downloads a program into memory from another machine across a network, where the network or the network download protocol has inadequate protection.

To mitigate the virus threat, a wide variety of products have been designed to detect, prevent, and remove viruses. Though prevention of a virus attack is beyond the scope of this invention, part of the need for this invention is that no purely preventive solution is 100% effective, especially in typical PC systems. Software-only protective measures can only offer a limited form of assurance against malicious attack, generally because the protection software and the virus must share the same address space. The protection software is thus vulnerable to a virus attack designed to specifically target the protection program. Thus, even if an existing software product perfectly protects against all current viruses, there is no guarantee that a new virus will not be developed to circumvent the product, and escape detection. Some of the anti-virus products on the market use special hardware to address the problem, but these generally focus on preventing virus infection, rather than assessing integrity. And both hardware and software-only products often rely on the secrecy of the product design or implementation. A virus developer can discover secret design details by reverse engineering the product, and a software attack can be designed to circumvent these solutions.

The field of virus detection provides another level of defense against viruses. If a virus infection has already occurred, it is often possible to detect and remove the virus before more serious damage can occur. This field is related to the more general field of software integrity assessment. Some methods of virus detection, such as searching for data patterns indicating the presence of specific viruses, cannot be used as a general integrity test. But a strong integrity assessment test can offer strong proof that no virus has infected a given program. The use of "modification detection codes", discussed further below, provides a strong test for integrity and viruses.

Software viruses are only one class of security threats that can be introduced to a system with a Trojan horse attack. Other threats include attacks directed at obtaining security-sensitive data, such as passwords.

Accidental corruption of the PC system is also a common problem, typically resolved by a system restart. Somewhat less commonly, a copy of an operating system on disk becomes corrupted, and if the system restarts without detecting the corruption, further damage may occur. Our invention can also detect such accidental system failures.

The "trusted path" feature is an important component of secure systems, designed specifically to eliminate Trojan horse and other threats during security-critical operations, such as a login process. A trusted path unambiguously establishes a secure connection between the user's input device and a trusted program, such that no other hardware or software component can intervene or intercept the communication. This is sometimes implemented with a reserved keyboard key known as the "secure attention key", as is described in U.S. Pat. No. 4,918,653. Trusted path is a required feature of systems evaluated against higher levels of the U.S. Department of Defense TCSEC security standard. The European ITSEC has similar requirements, and there is recent recognition that "trusted path" is needed as a minimal requirement for secure general-purpose commercial systems. One form of this invention provides a trusted path to a login program, using the PC's reset switch as a secure attention key.

Much of the preceding background has suggested a need for integrity assessment methods, and there is relevant prior art in this field as well. A widely used technique is to compute an integrity assessment code on a program, and verify that the code matches a predetermined value before executing the program. We will discuss two different approaches for computing the integrity assessment code, namely checksums and modification detection codes.

Within the PC, the BIOS program which resides in read-only memory (ROM) is the first program to run when the system starts up. As part of its initialization it looks for other ROM extensions to BIOS, and verifies the checksum of these extensions programs before allowing them to be used. This is described in "IBM PC Technical Reference—System BIOS". U.S. Pat. No. 5,022,077, also uses checksums to validates extensions to the PC BIOS program where the extensions reside outside of the ROM. But the real focus of their patent is on protecting the storage area where BIOS extensions are kept, rather than verifying their integrity. And their storage protection method shares the architectural weakness of most software-controlled protection schemes on the PC.

U.S. Pat. No. 4,975,950 claims the invention of checking a system for the presence of a virus at system initialization, and preventing operation if a virus is found. But, rather than defining a virus-detection technique, or an integrity assessment method as in our invention, it uses only "known techniques for checking file size, file checksum, or file signature".

Although checksums are adequate for detecting accidental modifications of data, they are an insecure defense against deliberate modification. It is in fact very easy to modify a message such that it retains the same checksum value, and whole classes of more complex algorithms, including cyclic redundancy checks, suffer from the same problem. To address this problem, "modification detection codes" have been designed to specifically detect deliberate corruption of data, and are superior to earlier methods, such as checksums. Whereas data can be intentionally modified in a manner that preserves a chosen checksum, it is intended to be computationally infeasible to modify data so as to preserve a specific modification detection code value. The security of a good modification detection code algorithm may depend on solving a particularly difficult unsolved mathematical problem, one that has withstood prolonged serious attention by experts in cryptography and mathematics. Modification detection codes are also known by other names in the literature, including: "cryptographic checksum", "cryptographic hash", "secure hash algorithm", and "message digest". There has also been recent progress in finding strong, yet efficient algorithms, including a recent proposed standard algorithm described in "National Institute of Standards and Technology—Proposed FIPS for Secure Hash Standard", Federal Register, Jan. 1992, page 3747.

Modification detection codes are also commonly used in conjunction with the use of "public-key digital signatures", which can authenticate the originator of a message. Creating a digital signature for a message often involves computing a modification detection code for the message, and then a further computation that "signs" the code with a private key held only by the originator of a message. A public-key that corresponds to the originator's private key is made widely available. The signature can be then be verified by any person who has access to the originator's public-key, with a computation that uses the modification detection code, the signature, and the public-key. The digital signature technique, a popular example of which is described in U.S. Pat. No. 4,405,829 ("RSA"), is used in an enhanced form of our invention.

Modification detection codes have also been applied to the problem of virus protection on PCs. Recent software products compute modification detection codes on programs and verify them prior to program execution. But software-only protection schemes for PCs suffer from the problem of residing in the unprotected address space. A potential solution is to embed the modification detection code in a permanent read-only memory device, but this makes system reconfiguration quite difficult. Other methods used in software products keep the modification detection code algorithm secret, and take measures to hinder the "reverse engineering" of the protection software. The weaknesses here are that it is difficult to predict how secrecy will be maintained, especially since reverse engineering is not a mathematically intractible problem. Other product announcements have described software-only verification systems using public-key digital signatures, in addition to modification detection codes, to verify programs.

Our invention uses a combination of known techniques, as described above, but it further incorporates a new hardware memory protection latch to make security mechanisms immune to software attack. One result is that our integrity assessment method is immune to the kind of violations it is intended to detect. A review of prior art in memory protection is therefore appropriate.

In this field, a wide variety of software and hardware methods allow the memory address space to be partitioned and allow control over which software has access to individual regions of the memory. These methods generally allow trusted software to both enable and disable the protection mechanism for a given region of memory, and these methods are often tied to central features of the architecture of the systems central processor unit (CPU). The memory protection method in our invention is partly distinguished by only allowing software control in one direction: from unprotected to protected mode.

An add-on memory protection method, structurally similar to the one in our invention, but allowing two-way switching, is described in U.S. Pat. No. 4,388,695. The previously mentioned U.S. Pat. No. 4,825,358 also briefly describes memory protection hardware for a PC, which uses software to enable and disable the protection.

Other patented, memory protection schemes that have used a one-way switching latch have been either in the opposite direction, that is only from protected mode to unprotected mode, as in U.S. Pat. No. 4,651,323, or have been designed for a different purpose and are triggered by a different mechanism, as in U.S. Pat. No. 4,685,056.

In the field of user authentication, many methods have been developed, including the common, and often controversial, use of passwords. Rather than review these methods in detail here, the relevant fact is that almost all methods require access to secret user-specific authentication data during the authentication process. To minimize the threat of secret passwords being revealed, it is generally recognized that passwords should be stored in a one-way hashed form to thwart attacks that look for them. But even one-way hashed passwords should be kept secret in order to thwart "brute-force" computational attacks on the known hashed password. Such attacks are especially easy if the password is poorly chosen. The Department of Defense Password Management Guideline—CSC-STD-002-85, April 1985, discusses many of these issues.

In PC systems, there are many products that use passwords. Of particular interest here are systems that require a password for initial startup of the system, sometimes implemented within the ROM BIOS. Some BIOS password implementations keep a hashed form of the password in an unprotected readable and writable non-volatile memory used to store configuration data, known as the "CMOS RAM", and thus the stored hashed passwords are vulnerable to being read or written by untrusted applications.

In general, integrity assessment is needed in many systems because no purely preventive measures can guarantee that a system will never be corrupted. Even systems that use protected addressing modes have complexities that can be explored to attack system integrity. A natural time to check system integrity is at startup, and a startup integrity check is particularly beneficial for personal computers since they can be restarted frequently.

The concept of transient trusted software has been introduced to allow systems without a strong protection architecture to nevertheless use strong security methods during system initialization. Our invention assesses the integrity of the trusted software, to discover any corruption as the system starts. The combined hardware and software approach used here makes this method immune to software-only attack, and the security of this method does not depend on keeping secret the design details of either the software or the hardware. This additional integrity guarantee is best used in combination with traditional protection methods to enforce a wide range of security policies.

Standards for evaluating computer system security, such as the TCSEC, require a high level of assurance for a product to be rated at the upper levels. Such systems may be analyzed against a mathematical model of security, and may involve formal proof techniques. The nature of the design of this mechanism suggests that such an analysis may be possible.

In light of this discussion of the prior art, the aforementioned problems with existing security solutions, the need for strong measures to verify the integrity of computer system software, and the need for storing secret authentication data, we proceed to describe this invention. Particular preferred embodiments of the invention on an IBM PC are described here to provide additional protection against certain PC viruses, a "trusted path" login procedure, and an improved means of maintaining the secrecy of stored authentication data.

OBJECTIVES AND SUMMARY OF THE INVENTION

It is therefore an object of this invention to assess the integrity of trusted software during the system initialization process, and to prevent incorrect programs from executing.

It is another object of this invention to correctly assess software integrity, even if a potential attacker has complete knowledge of the hardware and software system design, and has access to the system software. The mechanism must force an attacker to resort to directly attacking the hardware of the specific system, in order to undetectably modify the software.

It is another object of this invention to permit reconfiguration of the trusted software without requiring hardware modification by the user.

It is another object of this invention to allow the set of trusted software to be arbitrarily large, and to efficiently assess the integrity of software components.

It is another object of this invention for the hardware component to be fully compatible with existing system software, meaning that the new mechanism can be disabled by software if it's not needed in a specific configuration.

It is another object of this invention to allow a trusted path to be established between the user and a program in response to a signal initiated by the user.

It is another object of this invention to enhance the secrecy of authentication data used in an access-control mechanism, when user authentication software is contained within the trusted initialization software.

In accordance with the above objects, embodiments of the invention highlight different uses of a hardware latch memory protection mechanism. One or more regions of non-volatile memory are provided, in which security-relevant data are stored. Access to a protectable memory region is controlled with a latch mechanism, such that the memory is always both readable and writable when the computer is first started. But during system initialization trusted software closes the latch to protect the memory, and thus prevent all subsequently run programs from reading and/or writing the security-relevant data during normal operation. Once closed, the latch can not be opened by software control. The latch is only re-opened when the system is restarted, which can occur by either momentarily turning off the power switch, or by pushing a reset switch. When the system is restarted, control of the CPU returns to a trusted startup program in read-only memory.

The memory protection latch mechanism prevents software-only attacks on the stored data during normal operation. This protection remains even if complete knowledge of the system design is available to an attacker.

Embodiments of the invention store data in a protectable memory region during a software configuration process, and use this data to verify system initialization programs before they are run. The computer starts up in a mode where the latch is open, and the memory is readable and writable. The first program to run resides in invulnerable read-only memory. It loads a second stage program from vulnerable memory into main memory, and before it transfers control to the second program, the first program verifies the integrity of the second program using the verification data stored in the protectable non-volatile memory. If an integrity violation is detected, the second program is not run, and the user is warned of the problem. If integrity is verified, the second program is run. During normal operation, trusted software closes the latch to prevent the verification data in the non-volatile memory from being modified by subsequent programs. The latch is left open for special re-configuration purposes. Variations of this embodiment use differing methods for verifying programs using the protected verification data.

In one variation, modification detection codes provide a suitably strong means of integrity verification. Before the first program transfers control to the second program, it computes, using known techniques, a modification detection code for the second program, and compares it to a pre-computed stored code in protectable non-volatile memory. If the codes are not identical, then the second program is not run, and the user is warned of the problem.

In another variation of the embodiment that verifies trusted initialization software, a public key digital signature method is used. A public key of a trusted authority is stored in the protectable memory, and the ROM startup program uses public key digital signature verification to insure that the software is correct before it is run. Modification detection codes are used here too, but the code for the second program resides in the same memory device as the program itself. It is protected from malicious modification by being signed with the private key of the trusted authority. This signing process generally occurs off-line, on a more trustworthy machine, in order to keep the private key secret. The verification process occurs in two steps: first the signed modification detection code is retrieved during the "unsigning" or digital signature verification process. Then, if the signature verification was successful, the unsigned code is compared to the computed code on the loaded program. The program is not run if either the signature verification fails, or if the code is incorrect.

In more complex embodiments, the set of trusted initialization software is made arbitrarily large, by using a hierarchy of verification codes. In this method, the second stage startup program verifies and then calls another trusted program, and each trusted program that loads and runs other trusted programs is modified to verify their integrity before running -them. This process is repeated until an untrusted program is run. Once an untrusted program is run, the entire system is then said to be in an untrusted mode. Thus, care must be taken during system configuration to identify all the components of trusted system software and their relationship to each other. In these more complex embodiments, the latch may be closed by any of the trusted initialization programs, rather than just the first program.

In a "trusted path login" embodiment, the set of verified trusted software includes all programs up to the point of running an initial login program. The user presses a reset switch to initiate a secure connection to this trusted login program. The login program closes the latch on the integrity verification data before running the normal operational mode. In special cases, the login program may allow the user to run in a mode where the latch remains open to permit reconfiguration of the verification data by suitably authorized users.

In another embodiment a region of protectable memory contains user authentication data, such as a password. A login program that runs whenever the system starts up can access this data, but before allowing the user to run the system, the login program closes a latch to protect the authentication data from being modified or read by any subsequent program.

DESCRIPTION OF PREFERRED EMBODIMENTS

Figure 1:
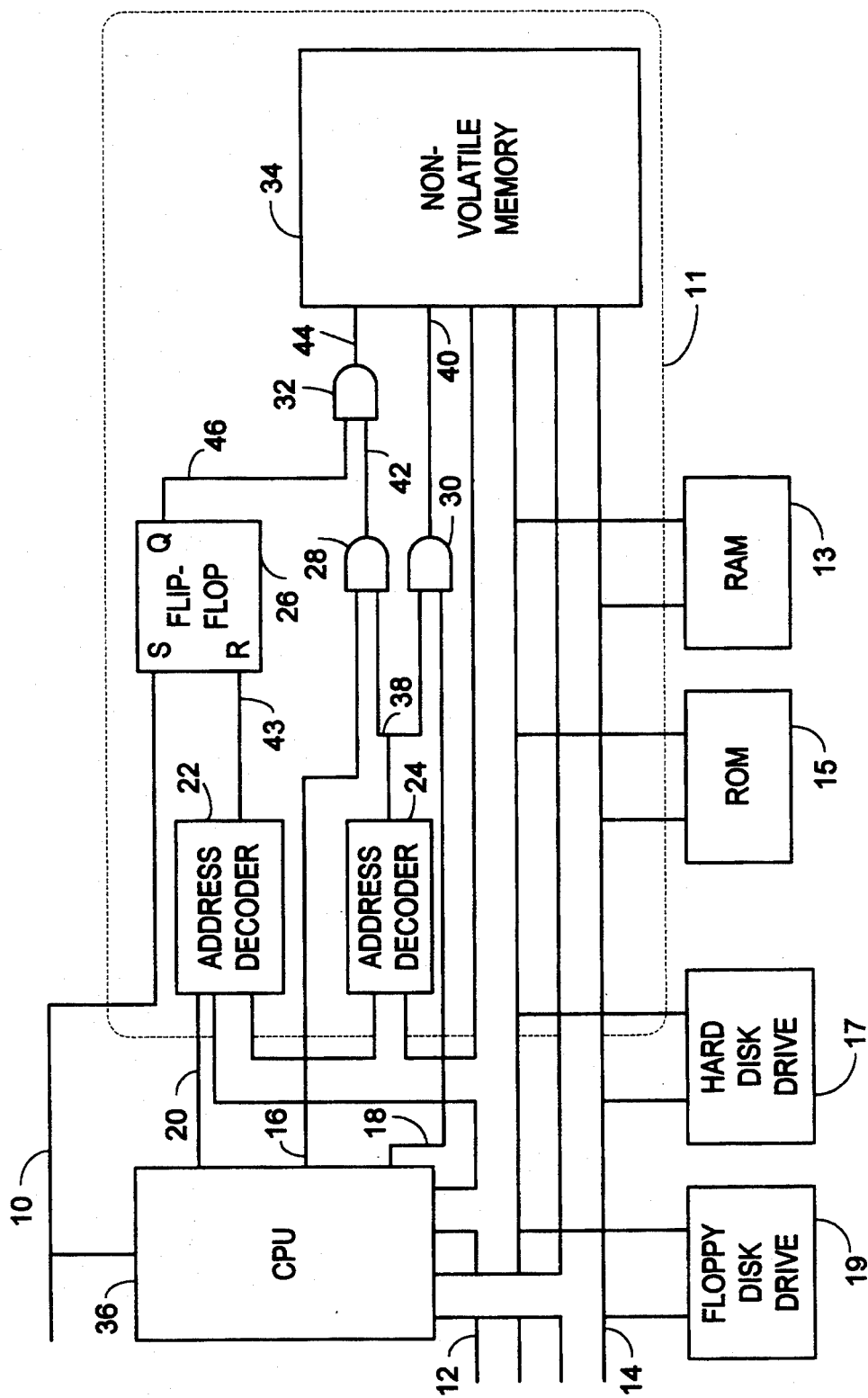
FIG. 1 shows the hardware latch mechanism which may prevent the CPU from writing to a non-volatile memory.

Various embodiments described here highlight different aspects of the invention. The most detailed embodiments here are for the IBM-compatible PC system, running a version of the DOS operating system, though the invention can be modified for use in many other computer systems.

The central element of these embodiments is a one-way latch, which protects data stored in non-volatile memory. The latch is opened at time of system reset, permitting access to the memory. In normal use of the system, the latch is closed by trusted initialization software, causing the non-volatile memory to be protected. The latch is closed before any untrusted software can run, and thus the data stored in protectable memory is immune to attack from untrusted software. This protected data is typically used by the system to perform security functions. Although software can close the latch to disable access to this data, no software means is provided to re-open the latch. The rationale behind making this a one-way operation is that a system can be tightly controlled only during the initial startup phase of operation. After it begins running as a general-purpose system, the risks of running an untrusted program that might attack the security data become too great. It is assumed that if a trusted program has a means to disable the memory protection, then it will be possible for an untrusted program to do the same.

In our first described use of the latch, data which is used to verify the integrity of the initial startup software is stored in the protectable memory. The initial trusted software in turn is responsible for closing the latch to protect the data from being accessed by later less-trusted programs.

The embodiments described here also show how the invention is designed to allow re-configuration of the system without requiring hardware access, while hardware access is required to defeat the system.

Methods are described that extend the verification process to cover as much of the system as is appropriate. The idea of computing a modification detection code for a program, or a list of programs, is improved to use a hierarchy of codes to cover a complete set of trusted software. The integrity assessment process may occur in multiple stages, beginning with the first stage bootstrap program. The first stage program verifies the integrity of the second stage before passing control to the second stage. The second stage verifies the integrity of the third, and this process continues until the entire set of trusted software is verified.

BOOT RECORD VERIFICATION EMBODIMENT

One embodiment of the invention in an IBM PC provides a secure way to verify the integrity of the boot record software during system initialization, and prevent corrupted boot record programs from running. Latched write-protectable memory contains and protects boot record verification data. System configuration procedures are also described.

This particular system is assumed to contain one hard disk, and one removable diskette drive, and the machine can be bootstrapped from either the hard disk or the diskette. The standard PC is herein modified with additional hardware, in the form of a plug-in card shown in FIG. 1, and software changes made within the ROM BIOS program as shown in FIG. 2. The software uses specially configured data, shown in FIG. 3 and FIG. 4, which is stored in protectable memory on the plug-in card.

The method computes a modification detection code on the boot record when the system starts up, and compares the code to a previously stored value in non-volatile memory. If the value does not match, the boot record program is not run, and the user is warned of the error. Two modes of operation of the improved system are described, and a compatible configuration where the device is disabled is also described. This embodiment provides an extra line of defense against software virus and Trojan Horse attacks directed against the boot record.

We will first define the two modes of operation of the system:

User mode, which protects the integrity assessment data in the non-volatile memory from any software modification.

Config mode, which does not protect the data.

We also define two ways to configure the system:

A secure configuration, where the system detects and avoids running any invalid or damaged boot record. The secure system can run in either user mode or config mode.

The compatible configuration, where the PC behaves as if the invention were not present. The compatible machine is always in config mode.

Figure 5:
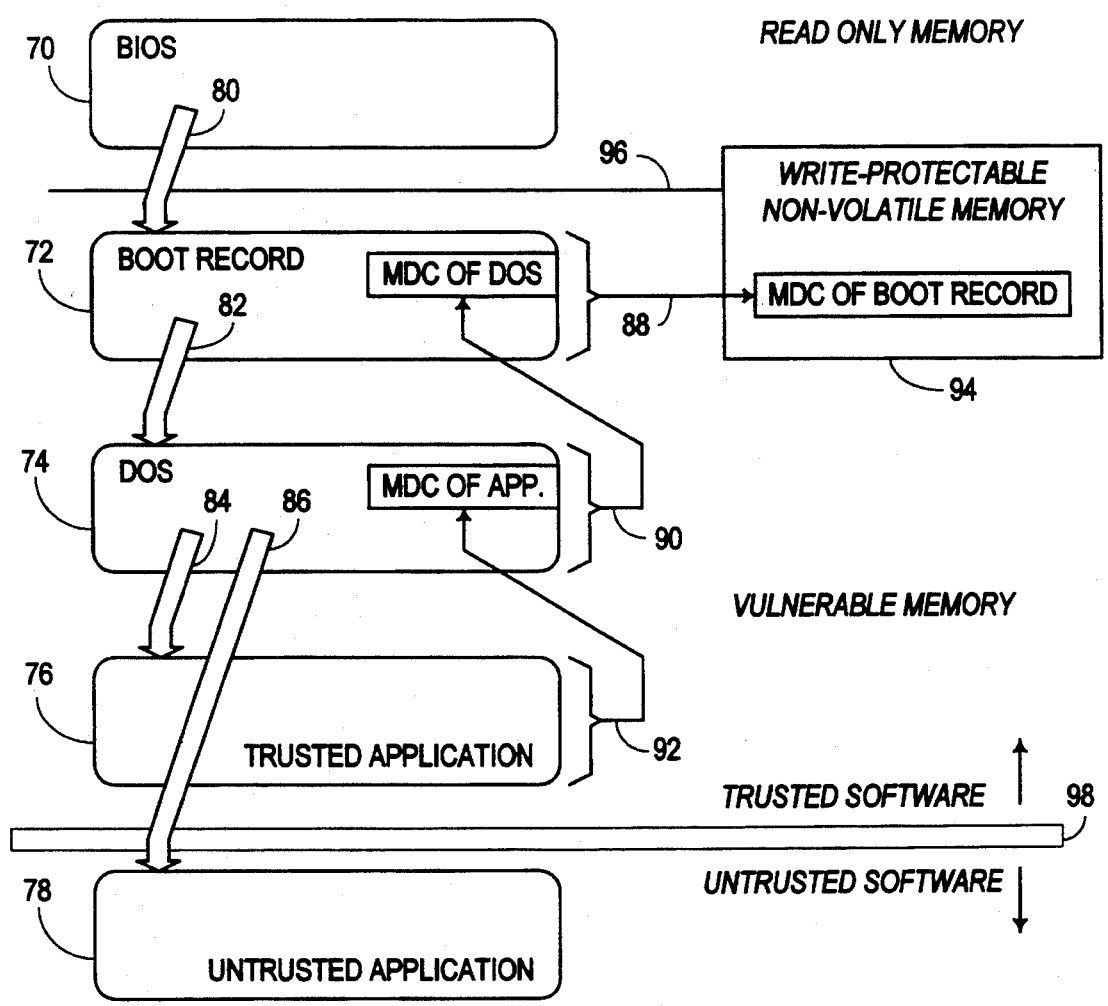
FIG. 5 shows the hierarchical startup process of a PC, and shows how a hierarchy of modification detection codes are related to the trusted software.

First we will present a brief overview of the PC startup sequence, referring to FIG. 5. The typical programs involved in the startup process are BIOS 70, the boot record program 72, and DOS 74. There may be several files that together comprise DOS, depending on which version of DOS is used. For example, in Microsoft DOS version 5.0, the files MSDOS.SYS, IO.SYS, and COMMAND.COM all contain pieces of the operating system. For simplicity, in this discussion we consider DOS to be a single program.

BIOS resides in read-only memory, and it is the first program to run when the CPU starts up. It performs some initial system checks, and then it loads the boot record program from disk into main memory, and runs the boot record program 80. The boot record program later loads and runs DOS, which in turn loads and runs applications. But our focus here is on enhancements to the BIOS program, and on a new verification process that occurs between the time when BIOS loads the boot record program into memory, and the time when BIOS runs the boot record program. The new verification process in the BIOS startup program is shown in FIG. 2, and it uses uses data stored in protectable non-volatile memory FIG. 1—34, as detailed in FIG. 3.

We now discuss the configurations and operational modes, including the process for switching from one configuration to another.

Secure configuration—in user mode

Figure 2:
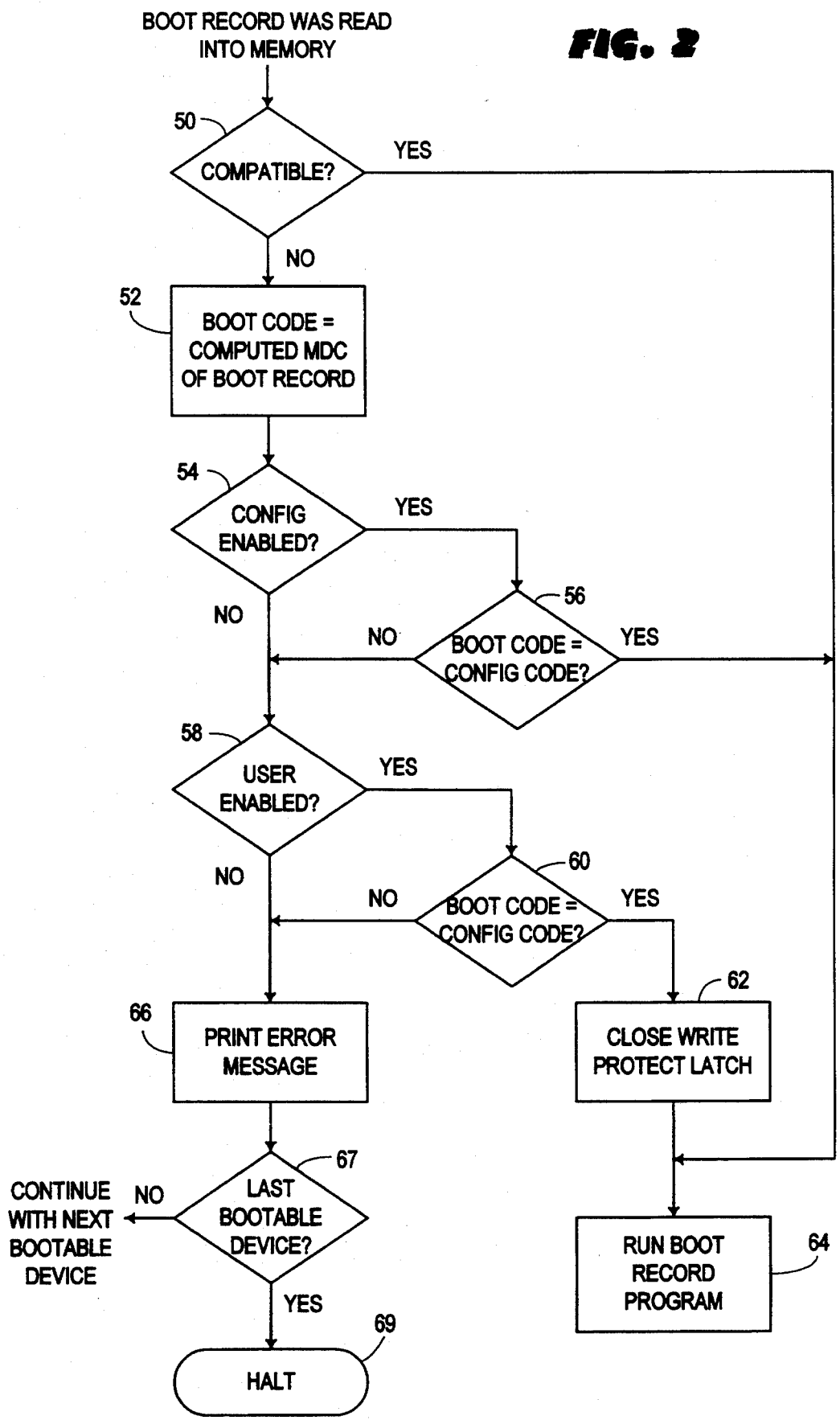
FIG. 2 shows the PC BIOS enhancement which verifies the integrity of the boot record program.
Figures 3, 4, 7:
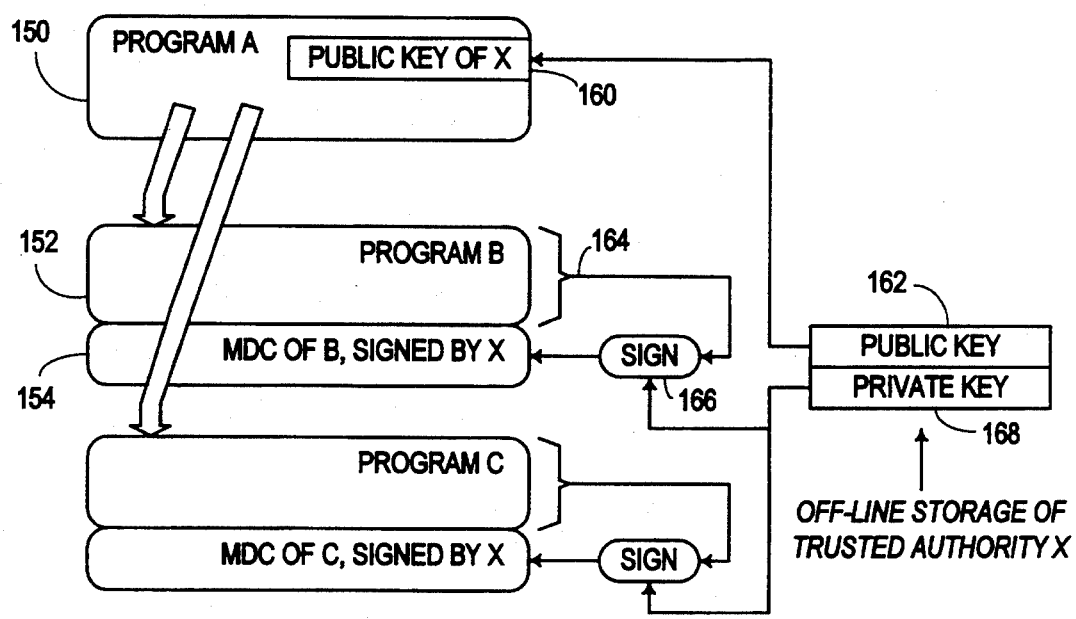
FIG. 3 shows the data stored in protectable non-volatile memory for a secure configuration.
FIG. 4 shows the data stored in protectable non-volatile memory for the compatible configuration.
FIG. 7 shows an alternate way to use pubic-key digital signature codes to verify trusted software.

User mode is the normal mode for running the system with the integrity assessment feature enabled. When the system is reset, the write-protection latch is open, leaving all the verification data stored in non-volatile memory readable and writable. FIG. 3 shows the values for this secure configuration. Other secure configurations are possible, as will be seen later. First we will describe the secure configuration data, and then we will walk through the initialization process shown in FIG. 2.

The variable compatible is set to FALSE 110, indicating that the secure mode is enabled. The userEnabled 111 and configEnabled 113 variables are both set to TRUE, indicating that the system can be started with either of two boot records, one which will run in user mode, and the other which will run in config mode. The userCode 112 and configCode variables 114 respectively contain the modification detection code values for the correct user-mode and config-mode boot records. The values shown here are arbitrary examples.

Now, walking through the enhanced BIOS startup process in FIG. 2, and refering to data values shown in FIG. 3, we assume that the BIOS startup program has loaded a boot record program into memory. Our verification process begins when test 50 fails, because the value of compatible is FALSE 110. Proceding on to step 52, a modification detection code is computed for the boot record, and stored in a temporary variable "bootCode" (not shown in the drawings). We assume here that the boot record that was loaded is the correct boot record intended to be used in "user" mode, and that its value was computed to be A6339DE4D-BE72231. Test 54 succeeds because configEnabled is TRUE 113. Test 56 fails because in this case the user-mode bootCode value does not match the value stored in confiCode 114. (The reasons for tests 54 and 56 will be explained below.) Test 58 succeeds because userEnabled is TRUE 111, and test 60 succeeds because the computed modification detection code value matches the expected value in userCode 112, indicating that the integrity of the boot record is intact. At this point in step 62 our enhanced BIOS closes the write-protect latch.

A detailed description of the latch is found below, but the net effect of closing the latch is to prevent all subsequent programs from modifying the data shown in FIG. 3. BIOS will run the boot record program, FIG. 2—64, and the system will continue its usual initialization process, with the restriction that the integrity assessment data cannot be modified. Thus, if the system subsequently changes the boot record, intentionally or not, the changes will be detected by BIOS the next time the system is reset. This is the crucial feature of "user" mode.

A subtle point about the previously mentioned invention described in U.S. Pat. No. 4,825,358 is that they use the CPU reset function to switch from protected to unprotected addressing modes. Their BIOS modification distinguishes between a reset that causes a system restart, and a reset that switches modes. In an embodiment combining both their and our inventions, it is intended that the system reset function described in our invention cause control to return to the startup bootstrap process described in theirs.

If the boot record has been corrupted, step 52 of the initialization process in FIG. 2 will compute a different modification detection code value, recalling that it is practically impossible for two different programs to compute codes to the same value. The remainder of the initialization process will be the same as for a correct user boot record, up until test 60, which will fail. At this point an error message will be printed 66.

If this is not the last bootable device in step 67, the next bootable device is tried as is normal. If this is the last bootable device, in step 69 the machine will halt as it normally does when no valid boot record is found.

We will now describe the hardware latch mechanism shown in FIG. 1. In this embodiment, most of the components including the address decoders 22 and 24, the flip-flop 26, the AND gates 28, 30, and 32, and the non-volatile memory 34 are on an add-on card 11. The non-volatile memory on this card contains the previously discussed data shown in FIG. 3. The CPU 36 is on the PC's motherboard, and the add-in card plugs into a slot on the motherboard and connects to the system reset line 10, the address bus 12, the data bus 14, a memory write line 16, a memory read line 18, and an I/O control line 20.

To simplify understanding of the hardware, throughout this discussion all signals are assumed to be high active. Further, the operations of the bus signals as described here may differ slightly from the bus signals in an IBM compatible PC. If the machine in which this is implemented has a different bus structure than described here, additional hardware is necessary to translate the bus signals into the form described here, or the design can be modified appropriately. In this description, the CPU performs a memory read operation by driving address bus 12, asserting memory read line 16, and reading the data from data bus 14. Similarly, a memory write operation drives address bus 12, places a data value on data bus 14, and asserts memory write line 18. And during an OUT instruction, the CPU places the I/O address on address bus 12, places data on data bus 14, and asserts I/O control line 20. Unless specifically stated otherwise, each line is assumed to be deasserted.

RAM 13 and ROM 15 are connected to the address bus 12 and data bus 14 to allow access by the CPU 36. Similarly, hard disk drive 17, used to store programs, and floppy disk drive 19, used with floppy diskettes, are connected to the address and data buses 12 and 14 to allow access by the CPU 36.

The non-volatile memory occupies a reserved range of main memory space, typically somewhere between addresses A0000 and EFFFF, and it is generally readable by the CPU. In this example, we'll assume it contains 128 bytes. Address decoder 24 detects when the specific address range of the non-volatile memory is present on the address bus, and asserts the "memory enable" line 38. This signal causes AND gate 30 to logically connect memory read line 18 from the CPU to the memory chip's read input 40. It also causes AND gate 28 to connect memory write line 16 from the CPU to the "selected memory write" line 42. The selected memory write line passes through AND gate 32 before it connects to the write input 49 of memory chip 34. The other input to AND gate 32 is controlled by the write protect latch as follows.

When the system first starts, reset line 10 is momentarily asserted, which asserts the S input of flip-flop 26. The flip-flop then asserts and maintains its Q output signal to line 46, which is connected to AND gate 32 and causes it to logically connect the selected memory write line to memory write input 49. Thus, the non-volatile memory is initially writable after a system reset. At this point the latch is said to be open.

In order to close the latch, the CPU 36 performs an OUT instruction to a special port address. Decoder 22 recognizes the special port address on address bus 12, in combination with the appropriate I/O control signed on line 20, and asserts line 43 which is connected to the R input of flip-flop 26. This causes the flip-flop to de-assert the Q output to line 46, which has the effect of disabling the selected memory write signal that passes through AND gate 32. The Q output remains in this state until the next system reset signal occurs, and line 49 which is driven by the output of AND gate 32 remains deasserted. The latch is now said to be closed, and it cannot be opened by any means other than the reset signal. The reset signal on line 10 also drives the reset input of CPU 36, and causes it to return control to the BIOS startup program.

When the latch is closed, no software process is capable of modifying the contents of the data in 34, which is used to verify the integrity of the boot record. But as the boot record itself is not so specially protected, and is thus vulnerable to corruption, a boot record recovery method is necessary.

One simple method for recovering from a corrupted hard-disk boot record is to have a backup removable recovery diskette. This diskette contains a copy of the correct user-mode boot record, plus a tool to copy the correct boot record to the corrupted disk. Simply booting from this diskette, and running the tool will restore the boot record on the damaged disk to its correct form.

Secure configuration—in config mode

Ideally, once the system is set up for secure user mode, the validation data would never have to be changed. But at least one reason for needing config mode, where the validation data can be changed, is to allow the system to be upgraded with a new boot record, as part of a general installation of new software. This "config" mode should only be used in these relatively uncommon circumstances, and the mode should only be available for authorized people.

One way to control access to config mode is to create a special reconfiguration diskette, only to be possessed by the authorized people. The reconfiguration disk contains a tool which puts a new user-mode boot record on the hard disk, and which writes a new modification detection code into protectable non-volatile memory.

Revisiting FIG. 2, assume that a modification detection code is computed for the reconfiguration diskette's boot record, and that the value, 15088428467F00BA, has been stored in configCode 114. We see that the initialization process for config mode is the same as for user mode, up to the point where test 56 succeeds because configCode is equal to bootCode. In the next step 64, the boot record program is run, without first closing the write-protect latch. Any subsequent programs, including the reconfiguration tool, now has the capability of writing to the validation data, and creating a new configuration. The reconfiguration tool then proceeds to copy the new user-mode boot record to the hard disk, and then compute a modification detection code for the boot record and write the value into userCode 112 in the protectable memory. The configuration of the boot record code is also diagrammed in FIG. 5—88.

Note that we assumed that the boot record of the reconfiguration diskette is different from the user-mode boot record. This is necessary because the configuration mode boot record is the key to telling BIOS to startup in config mode. If it is desirable to use the same boot record program for both modes, a random value can be written somewhere into unused memory in the diskette's boot record before the modification detection code is calculated.

This will insure that the boot record, and thus its modification detection code, will be unique.

Compatible configuration

The PC is initially shipped from the vendor with a compatible configuration. This machine operates as an ordinary PC would without the benefit of the invention; that is, boot record integrity assessment is disabled. Refering to the protectable memory data is setup as shown in the "compatible configuration" of FIG. 4, and following the flow chart in FIG. 2, we see that after BIOS loads a boot record, test 50 will succeed because compatible is TRUE 120. The remaining configuration variables 121, 122, 123, and 124 are ignored. Then the boot record program is run in step 64 with the write-protect latch left open, as it was at time of system reset. The system is thus left in config mode, and any program now has the capability of modifying the non-volatile memory, and reconfiguring the machine to a more secure state.

Initializing a secure configuration

In order to change a compatible configuration to a "secure" configuration, the following steps should be taken as soon as possible after initial system installation, that is, while the system software is still presumed to be trustworthy.

The first step is to compute the modification detection code for the boot record to be used in normal secure operation. The computed modification detection code value is written into userCode 112 in the protectable non-volatile memory. The modification detection code of the recovery disk is similarly computed, and stored in configCode 114. Then the value of userEnabled is set to TRUE 111, and configEnabled is set to TRUE 113. The final step is to set the compatible variable to FALSE. The order of operation is significant to prevent problems if the machine inadvertently shuts down during the configuration process. If the machine is restarted now, the only boot records recognized as runnable will be either the config mode boot record via tests 52, 54, and 56 in FIG. 2, or the user mode boot record via tests 58 and 60. An error message will be printed for any invalid boot record encounterred, and if no valid boot record is found, the system will halt.

Alternate secure configurations

Other variations of secure configurations are possible, such as setting configEnabled to FALSE. This has the effect of permanently locking the machine into user mode for a specific boot record. A method of allowing hardware access to restore the compatible configuration is probably desired to avoid problems with accidental lockouts. Some PC's that provide BIOS password access feature also provide a hardware jumper capability that can be set to bypass the password check, which is useful in case the password is forgotten. The same technique can be used here to cause BIOS to detect the presence of a hardware jumper, and restore the machine to the compatible configuration by setting the value of compatible to TRUE 120.

Another variation might be to maintain a list of valid boot record codes, rather than a single one for each mode, and check the actual code against the list in tests 56 and 60. This could allow upgrades and downgrades between different, yet equally valid, versions of the system software.

Trusted Path Login Embodiment

Whereas the preceding method only checked the integrity of the boot record, the following is an improvement for verifying the integrity of an arbitrarily large set of the system's trusted software, using a hierarchy of modification detection codes. In this embodiment, trusted initialization software will bring a PC up to the point where an initial login program is run. The reset switch or power-on switch initiates a "trusted path" login process, and the user is insured that he is communicating with the trusted login program.

In this method, the concept of a "hierarchy of verification codes" is introduced to show how to verify a hierarchy of trusted software. The system begins by running a trusted startup program. This program verifies and then calls another trusted program, and so on, until an untrusted software component is run. In this embodiment for a PC, once an untrusted program is run, the entire system is then said to be in an untrusted mode. Thus, care must be taken to identify all the components of trusted system software and their relationship to each other. To provide a trusted path feature, it is important that no untrusted software be allowed to run before the login program runs.

In some cases, the trusted software may cover the entire set of software on the system. When it does not, it is very important that the design of the trusted software make it clear to the user when untrusted mode begins.

Referring again to FIG. 5, we see that the components of the system software are divided into two categories, trusted and untrusted software. Line 98 is an imaginary boundary drawn between the trusted and untrusted programs, where everything above the line is trusted, and everything below the line is not. The four programs here comprising the trusted software are BIOS 70, the boot record 72, DOS 74, and the login program, here shown as a trusted application 76.

FIG. 5 also shows the division between secure memory and "vulnerable" memory, where vulnerable memory is subject to the threats outlined in the above background discussion. Above line 96 is the only permanently invulnerable memory, which resides in the systems read-only memory chips. Box 94 is drawn around the protectable memory provided in this invention. This memory is initially vulnerable memory when the system starts, but it is made invulnerable when the protection latch is closed, which occurs prior to running any untrusted software. The remaining memory below line 96 is considered to be vulnerable.

When the system starts, the BIOS startup program loads, verifies, and runs the boot record program 80 as described in the previous embodiment. This is a new boot record enhanced with code that will verify DOS before running it.

This new verification process is the same as the previously described BIOS verification process, except that the pre-computed reference code for DOS is stored in a reserved location in the boot record itself shown in step 90, rather than in protectable non-volatile memory. The boot record computes the modification detection code for DOS after DOS is loaded, compares it to the stored value to verify that DOS has not been corrupted, and then runs DOS. If corruption is detected, a warning is printed and the machine halts, and later a recovery process must be invoked.

The DOS program is enhanced to perform the same verification process on the login application before running it 84. And when login is complete, DOS may run other untrusted applications 78 and 86, without first verifying their integrity.

In order for the verification process to succeed, the system must be preconfigured with the correct modification detection codes stored in the appropriate places. Refering again to FIG. 5, the configuration process proceeds in the opposite direction, from the bottom to the top. First, a modification detection code is computed for the login program 76, and this value is written into a reserved location in DOS 92. Then, the code is computed for DOS, and stored in a reserved location in the boot record 90. And finally, the boot record code is computed 88 and stored in the protectable non-volatile memory 94.

The configuration must proceed in this direction because each trusted program contains modification detection codes for any called lower level trusted program. When a lower level program changes, the code stored in the higher level program changes, and the higher program's code must be recomputed. Continuing this analysis we see that each program is sensitive to any changes in all lower level trusted programs, and the top level code in protectable memory is sensitive to any changes in the entire set of trusted software. Thus, any single bit changed in the trusted software requires an "avalanche" of modification detection code changes all the way back to the top level.

The above description of the PC startup process is somewhat simplified, since DOS typically loads and runs one or more device drivers prior to running applications. But for our purposes, we can just consider these device drivers to be other trusted applications. We will now describe several ways that DOS can verify and run multiple trusted programs.

Figure 9:
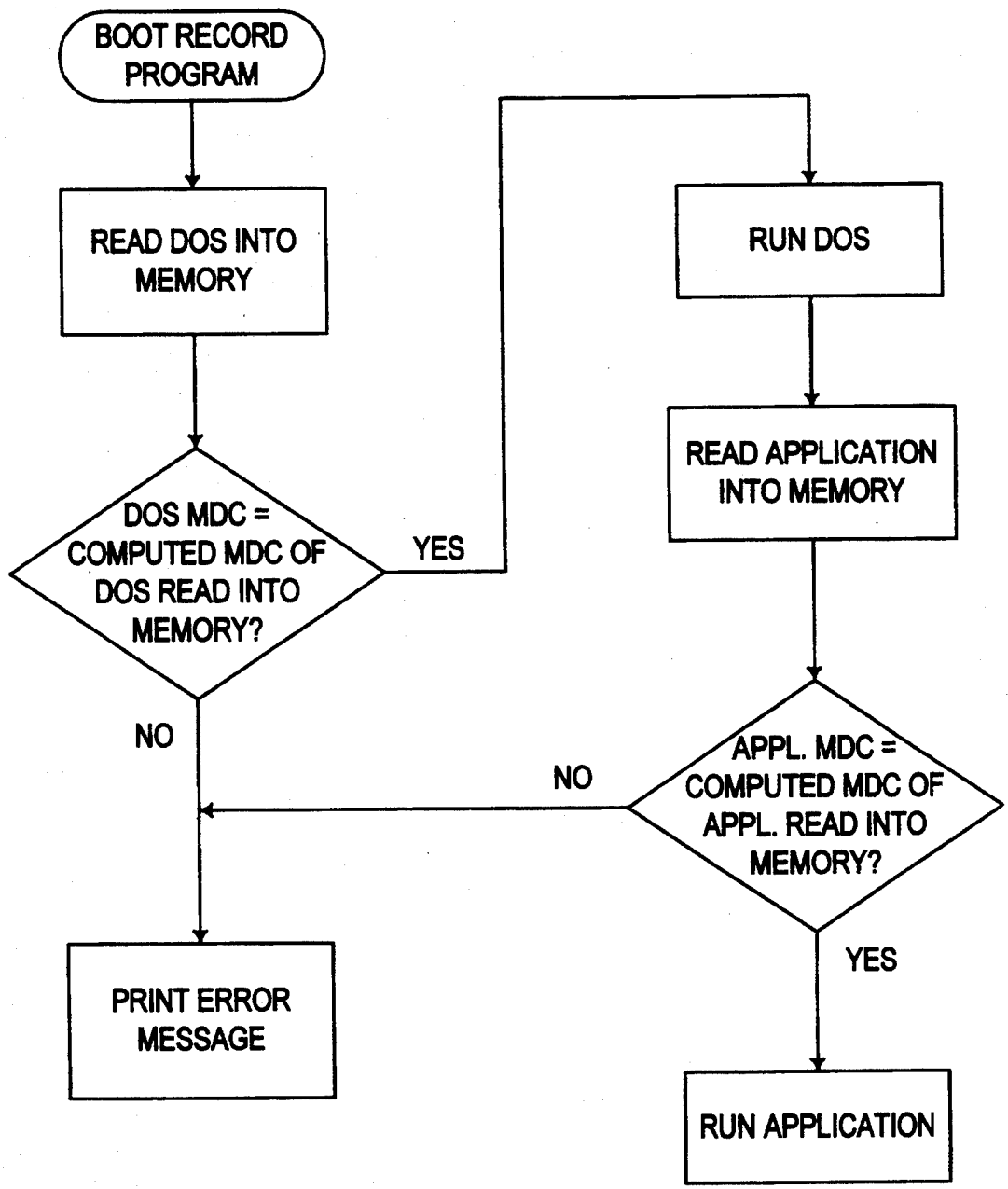
FIG. 9 shows a flowchart of the operations of the boot record program and DOS according to one embodiment.

FIG. 9 illustrates the flow of the process after the boot record program is executed. As can be seen, it operates similarly to the BIOS in loading, verifying and executing DOS, which operates similarly in loading, verifying and executing an application. This process could continue in a serial fashion if desired.

Figure 6:
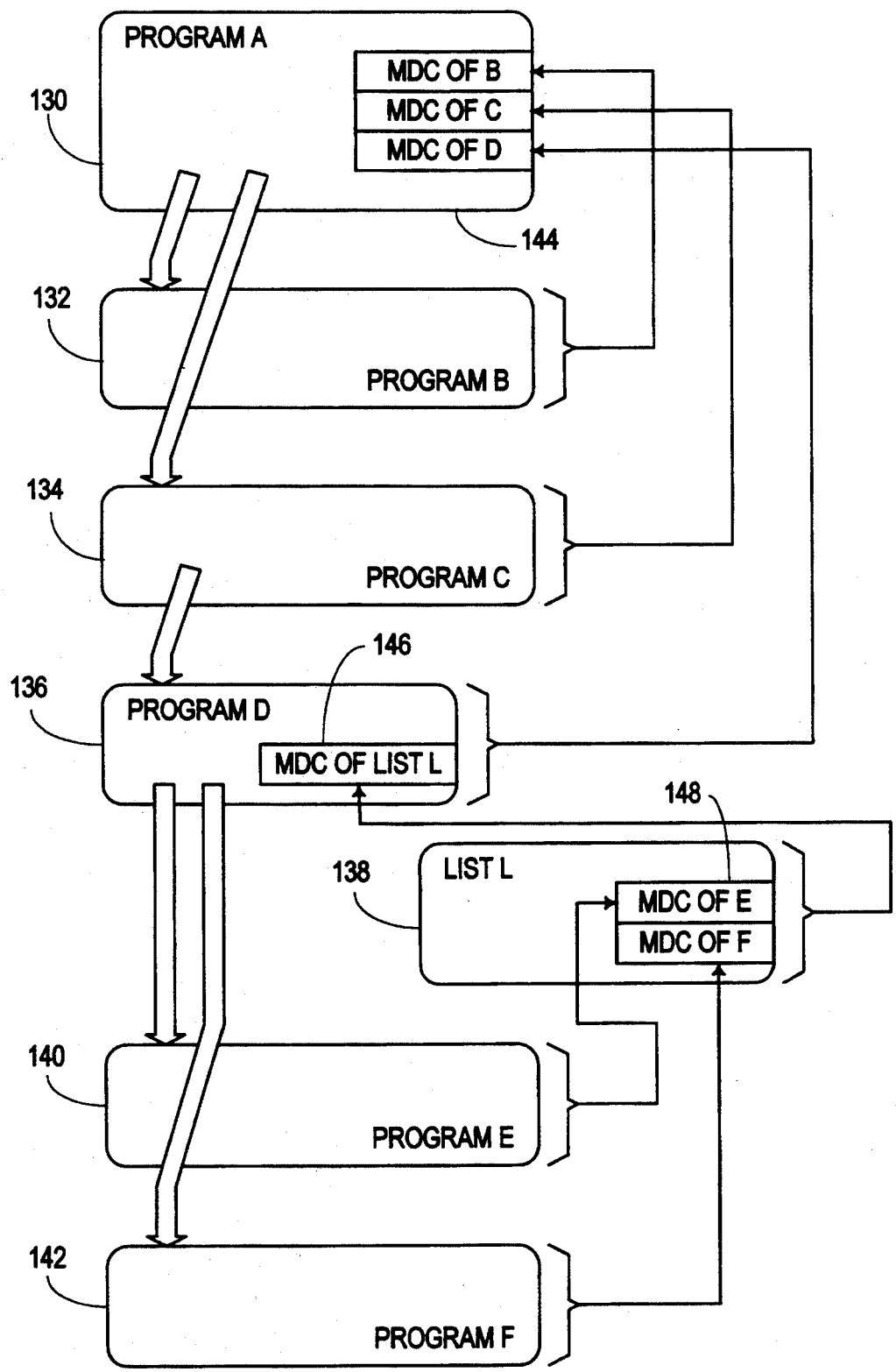
FIG. 6 shows a variety of ways in which a hierarchy of modification detection codes can cover the set of trusted software.

FIG. 6 illustrates several variations of the configuration and verification process. In order to verify multiple programs before calling them, DOS might contain a list of modification detection codes, one code for each trusted program to be run. This is illustrated with Program A 130 representing DOS, and Programs B 132 and C 134 representing trusted applications.

Figure 10:
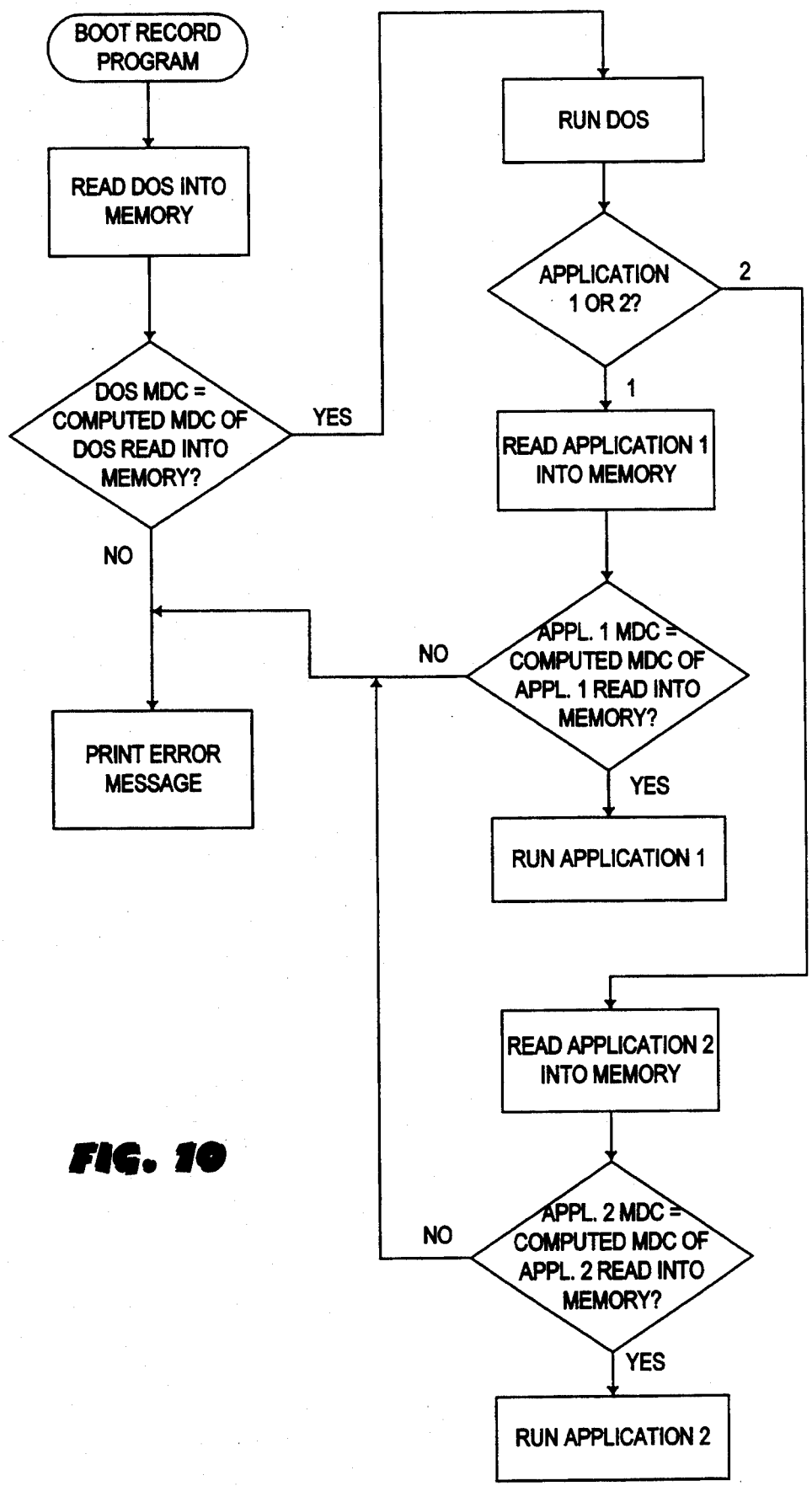
FIG. 10 shows a flowchart of the operations of the boot record program and DOS according to another embodiment.

FIG. 10 illustrates the flow of the process after the boot record program is executed for this alternative. Note that DOS loads, verifies and executes both applications.

Alternately, in order to minimize the amount of additional data stored in the DOS program, the list of codes could be contained in a file separate from DOS. The important point is to verify the integrity of the list of codes before DOS uses any of the codes to verify and run a subsequent program. One way to do this is to compute a modification detection code on the list, and store this code within the DOS program. This is illustrated with Program D 136 representing DOS, and Programs E 140 and F 142 representing trusted applications. Another variation, not shown in the diagram, is for the boot record to verify the list at the same time that it verifies DOS.

Yet another variation that requires no modifications to DOS, is to store the code for the list in a higher-level component, say the boot record, and insure that the list 148, the programs named in the list 140 and 142, and DOS 136 are all verified before DOS runs. This method requires that the configuration be tightly controlled so that DOS cannot run any additional unverified programs. This is also a less-desirable method because it is less efficient to read the program into memory a second time in advance to verify it, as opposed to verifying the program after it is loaded for execution.

Other variations are possible that change DOS without modifying the existing DOS files. This can be done by providing a companion verification program that enhances DOS by taking over one or more of the software interrupt vectors used by DOS during program execution. This type of approach is used by a wide variety of products in the PC marketplace, and those skilled in the art know of the many problems and limitations of this method.

A more flexible reconfiguration method

Now that we've verified trusted software beyond BIOS and the boot record, we can provide a more flexible means of permitting access to config mode. Rather than the "special configuration diskette" described above, the trusted login program can decide whether or not the user is authorized to reconfigure the system. In this configuration, the system always starts out running the boot record in config mode, and the trusted login program is responsible for closing the latch. Normally login will close the latch to let the system run in user mode, but if the user is authorized, login can leave the latch open and allow the user to run in config mode.

A network bootstrap method

Another variation of this embodiment enhances the security of diskless PC workstations on a network. In these machines the BIOS startup program is much the same, except that it initializes a network device, and loads the boot record and all subsequent programs across a network, rather than from a local disk. Although the network servers that store the bootstrap files often have some protective security features, there are several points of vulnerability, as mentioned in the background discussion.

The trusted path login mechanism described above, when adapted to a network login, protects against running corrupted boot records and other corrupted trusted programs loaded across the network. The BIOS improvements here are exactly the same as described in FIG. 2 are exactly the same, with the exception that there is no alternate bootable device. Since there is no local diskette drive, and hence no reconfiguration diskette, the previously described trusted-path login mechanism should be used to allow software reconfiguration. The BIOS of this system always runs the boot record in config mode, and thus there is no need for steps 58, 60, and 62. If the config mode code is incorrect, the system just prints a message and halts.

The addition of the public-key digital signature method, described in the following section, allows for further flexibility and control.

Improved Embodiment Using Public-Key Digital Signature

A variation on the method of using modification detection codes is described here. This method uses public key digital signatures, and it allows the trusted software to be partitioned into separate areas with each area configurable by a different trusted authority.

Recalling the discussion of how the hierarchy of modification detection codes is configured, the avalanche of code changes that are necessary whenever a trusted program changes may sometimes be a problem. It may be desirable to eliminate this effect for changes to certain parts of trusted software for any of the following reasons:

To prevent frequent changes to the top-level modification detection code in non-volatile memory, when the number of changes allowed during the lifetime of the memory device is limited to a small number, as in an EEROM.

To reduce the requirement for using a secure reconfiguration diskette.

To allow the set of trusted software to be partitioned into multiple subsets, with each subset reconfigurable by a different authority.

In this improved method, we define a subset of the trusted software, called the "authorized software", which, when changed, will not propagate modification detection code changes through the rest of the trusted software, yet it will still be verified before it is run.

The public-key digital signature variation is shown in FIG. 7. During configuration of an authorized program 152, a modification detection code is first computed 164, as before. But then a public-key digital signature is constructed for this modification detection code 166, using the private-key of a trusted authority 168, and this signature is stored associated with the authorized software 154, possibly appended to the end of the file. The corresponding public-key of this authority 162 is then stored in the higher-level component 160, rather than storing the modification detection code of the authorized program. During verification of the authorized program 152 the higher-level component 150 will compute the modification detection code for the program, and then, using the stored public-key 160, it will verify that the digital signature as stored with the authorized software 154 is correct.

It is assumed that the authority's public-key will change much less frequently than the authorized software will change, since public-key changes require that the modification detection code for the higher-level component be recomputed.

In order to achieve maximal flexibility of reconfiguration, the public-key might be stored in the protected non-volatile memory FIG. 5—94, and the bootstrap ROM would perform a digital signature verification, as opposed to the plain modification detection code comparison currently shown in FIG. 2, steps 56 and 60.

In an embodiment that uses public-key encryption, it is necessary that the signature generation process that occurs during configuration be done on a secure system. For high-security installations, the signing process might occur off-line, on a completely separate machine.

Improved Login Method with Secure Authentication Data

In another embodiment of this invention, the protectable memory stores and protects authentication data needed for an initial login process. This secure login method may be used with an improved version of the previously described trusted path login embodiment, and it uses an improved hardware implementation which provides two separately protectable regions of non-volatile memory. The login program is again considered to be a trusted application that is run at the time the systems starts up, as shown in FIG. 5—76.

Between the time the system starts and the time that login runs, the authentication data is both readable and writable. Login uses the data to determine whether the user is allowed access to the system. Then, after access is granted, but before login relinquishes control of the processor, two latches are closed to insure that the authentication data is not readable and not writable by other subsequently run untrusted applications. Write-protection prevents unauthorized modification of authentication data, and read-protection prevents disclosure of the authentication data.

The improved hardware divides the non-volatile memory into two equal sized regions, named region 0 and region 1, and each region has separate read-protection and write-protection latches. In this embodiment, region 0 contains the boot record verification data described previously in the trusted path login embodiment, and region 1 contains secret user authentication data.

The first steps of system initialization are the same as in the trusted path login. The BIOS bootstrap program loads a boot record into memory, confirms that its modification detection code matches the value stored in protectable memory region 0, and then closes the write-protect latch for region 0. BIOS then runs the boot record program, which verifies and runs DOS, which in turn verifies and runs the login program.

The improved login program obtains a password from the user, and compares it to a value stored in protectable memory region 1. If the password does not match, an error is printed and the machine halts. If the password is correct, two latches are closed to prevent any further reads and writes to memory region 1, and login then returns control to DOS, allowing the system to run.

Because of the latch protection, no subsequent programs have the ability to modify or read the authentication data.

Figure 8:
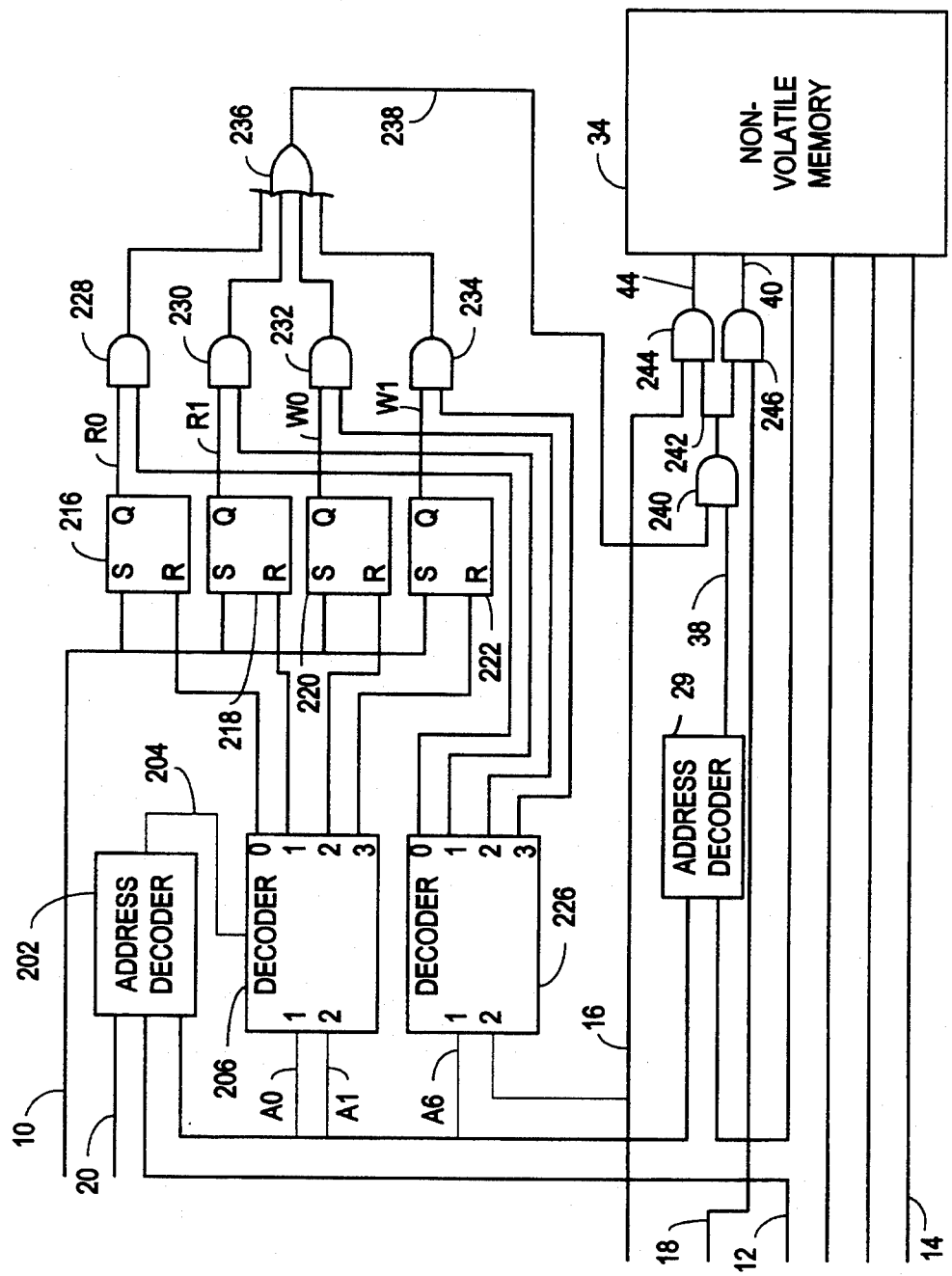
FIG. 8 shows a hardware variation providing independent read-protection and write-protection for two separate regions of non-volatile memory.

The improved hardware for this embodiment is shown in FIG. 8. This hardware is an extension of the hardware shown in FIG. 1, and components that serve the same purpose in the two drawings have the same numbers. In this example, four latches are settable by OUT instructions to specific I/O address, with the following effects:

| OUT E8 | Prevent reading from region 0 |
| OUT E9 | Prevent reading from region 1 |
| OUT EA | Prevent writing to region 0 |
| OUT EB | Prevent writing to region 1 |

Address decoder 202 takes input from the address bus 12 and the I/O control signal 20, and recognizes I/O write operations by the CPU in the range E8 to EB. These occur in response to OUT instructions issued by the CPU. When address decoder 202 detects an I/O write in this range, it asserts its output, which is connected to the "enable" input of decoder 206. Decoder 206 then asserts one of its four output lines, depending on the signals present on the low two bits (the A0 and A1 lines) of address bus 12. Each of the decoder's four output lines is connected to the R input line of a flip-flop. When the E8 is present on address bus 12, the two low bits are zero, and decoder 206 asserts the first output line, resetting flip-flop 216, and causing its Q output to be deasserted on line R0. Similarly, the R input of flip-flops 218, 220, and 222 are are asserted in response to OUT to addresses E9, EA, and EB, respectively, which deasserts lines R1, W0, and W1 respectively.

When the system is started, reset line 10 is momentarily asserted, which is connected to the S inputs of each of the four flip-flops, causing all their Q output signals to be asserted. Thus, all protection latches are said to be "open" when the system starts. Each flip-flop remains in this state until an OUT instruction resets it, at which time its Q output will be deasserted, and remain deasserted until the next system time the S input is asserted. It is crucial that the S input is asserted only by the system reset signal, and cannot be asserted by any other I/O or memory operation.

The non-volatile memory 34 is assumed to contain 128 bytes. This is divided into two 64 byte contiguous regions of memory, with address line A6 selecting the region. When A6 is asserted, region 1 is selected, otherwise region 0 is selected.

To show how the flip-flops control access to these regions, we will examine in detail a CPU read operation in memory region 0. The three remaining operations, read region 1, write region 0, and write region 1 all operate similarly. Address line A6, and the write line line 18 from the CPU, are connected to the two input lines of decoder 226. Decoder 226 has four output lines, each of which is connected to the input of one of four AND gates 228, 230, 232, and 234. Each of these AND gates can enable the Q output Line from one of the four flip-flops, 216, 218, 220, and 222 respectively, to be passed to the input of OR gate 236. The effect is that decoder 226 selects the latched Q output signal that is appropriate for the specific memory region and memory operation in use. All four signals, where only one is selected at a time, are input to OR gate 236, which then drives the "memory enabled" line 238.

When the CPU attempts to read region 0, it deasserts both A6 and the write signal, which causes decoder 226 to assert the first output line enabling AND gate 228. This causes the Q output signal of flip-flop 216 to be passed through line R0 to the input of OR gate 236. Since the other three AND gates 230, 232, and 234 are disabled by decoder 226, the output of OR gate 236 is identical to the signal coming from flip-flop 216, which, recalling that flip-flop 216 corresponds to the OUT E8 instruction, and is the appropriate signal for enabling read access to region 0.

Similarly, reads in region 1 select line R1 (the latched Q output signal from flip-flop 218), writes in region 0 select line W0, and writes in region 1 select line W1.

The "memory enabled" line 238 connects to the input of AND gate 240, which has another input from the "memory selected" line 38. The memory selected signal is asserted when decoder 29 detects a memory operation within the address range for memory chip 34, as was previously explained in the boot record verification embodiment. The output of AND gate 240 is thus a "memory selected and enabled" signal on line 242. This connects to an input of each of two AND gates 244 and 246, which enable the write 16 and read 18 signals respectively to be passed from the CPU (not shown in this diagram) to the memory chip write 44 and read 40 input lines.

At time of system reset, recall that line 10 asserts the S input of all four flip-flops, causing all four Q outputs R0, R1, W0, and W1 to be asserted. Regardless of which memory region is accessed, and whether it's a read or a write, decoder 226 will assert one of the four AND gates 228, 230, 232, and 234 which will select one of the asserted Q outputs to be passed to OR gate 236, which then asserts the "memory enabled" line 238. Thus, initially, both regions of the protectable memory will be readable and writable.

Many variations of the hardware used in this embodiment are possible. Some ways in which the hardware can be customized, without impacting the novel operational features, are as follows:

Increase or decrease the amount of memory to be protected.

Increase the number of distinct regions of memory to be protected,

Modify it to support other computer bus architectures.

Modify the region selection mechanism to accomodate different sized regions using an address range comparison, rather than the simple A6 bit decoder.

Make the non-volatile memory addressable from the I/O address space, rather than the memory address space, as is typically done for the PC's CMOS configuration memory.

Make the software operation which closes the latch a memory-mapped operation, rather than an I/O operation. This would be more appropriate for certain non-PC systems.

Reduce the number of distinct components using programmable logic arrays or custom integrated circuits.

Provide the invention on the motherboard of the system, rather than requiring a separate card.

Many variations of the secure login software in this embodiment are also possible, including:

Rather than comparing the dear-text password, compare a one-way hashed password to a hashed value stored in protectable memory. Even if a one-way hashed password scheme is used, storing the hashed password in protectable memory is beneficial, since unauthorized access to even one-way hashed passwords can pose a risk.

Rather than using passwords at all, use an alternative access control method, and keep the sensitive user-specific authentication data in the protectable memory.

In order to allow many different users to access the system, or in order to use a large amount of authentication data, the login program would lookup the user's authentication data in a file, rather than in the protectable memory. The file would be encrypted to make it less vulnerable to attack, and login would read and decrypt the contents of the file with a key each time it runs. The encryption key for this file would be stored in the protectable non-volatile memory.

As in previous embodiments, the login program here might also allow privileged users to run the system in a mode where the latches remain open, in order to reconfigure the authentication data.

It should also be noted that the method to protect authentication data does not necessarily have to be used with the integrity verification method. Versions of PC BIOS that provide initial password-based access control can be improved with this mechanism by storing the BIOS password in protectable memory. BIOS would also be changed to close the latches to protect the non-volatile memory before starting the system.

While the foregoing discussion has described particular preferred embodiments of an invention, variations beyond those already discussed may occur to those skilled in the art.

We claim:

1. A computer system comprising:

a processor;

random access memory;

read only memory containing a first program executed by said processor upon resetting of the computer system;

first storage means for storing first operating system and user programs executed by said processor, said first storage means including a region for storing a second program loaded and executed by said processor to commence booting the computer system from said first storage means;

second storage means for storing second operating system and user programs executed by said processor, said second storage means including a region for storing a third program loaded and executed by said processor to commence booting the computer system from said second storage means; and a non-volatile memory device having locations for storing first and second code values and accessible to said processor, said first code value being a modification detection code of said second program and said second code value being a modification detection code of said third program, said locations being readable and writable by said processor after a first reset of the computer system, being write protected after receipt of a designated signal from said processor and being made writable again only after a second reset of the computer system, wherein said first program includes:

means to determine if either of said second or third programs is present and loading said second or third program into said random access memory;

means to compute the modification detection code of the program loaded into said random access memory;

means to determine if said computed modification code is equal to said first code value stored in said non volatile memory device, to provide said designated signal to said non-volatile memory device if said computed modification detection code is equal to said first code value and to cause execution of the program loaded into said random access memory after providing said designated signal;

means to determine if said computed modification detection code is equal to said second code value stored in said non-volatile memory device and to cause execution of the program loaded into said random access memory without providing said designated signal to said non-volatile memory device if said computed modification detection code is equal to said second code value; and means to halt operation of the computer system if said computed modification code is not equal to either said first code value or said second code value.

2. The computer system of claim 1, wherein said locations of said non-volatile memory device are also read protected after receipt of said designated signal.

3. A computer system comprising:

a processor;

random access memory;

read only memory containing a first program executed by said processor upon resetting of the computer system;

storage means for storing second and third programs to be executed by said processor; and a non-volatile memory device having a first code value and accessible to said processor, said first code value being a modification detection code of said second program, said non-volatile memory device being readable and writable by said processor after a first reset of the computer system, being write protected after receipt of a designated signal from said processor and being made writable again only after a second reset of the computer system, wherein said first program includes:

means to load said second program into said random access memory;

means to the compute the modification detection code of said second program loaded into said random access memory;

means to determine if said computed modification detection code of said second program is equal to said code value stored in said non-volatile memory device, to provide said designated signal to said non-volatile memory device if said computed modification detection code of said second program is equal to said code value and to cause execution of said second program loaded into said random access memory after providing said designated signal; and means to halt operation of the computer system if said computed modification code of said second program is not equal to said first code value, and wherein said second program includes:

means to store a second code value being a modification detection code of said third program;

means to load said third program into said random access memory;

means to compute the modification detection code of said third program loaded into said random access memory;

means to determine if said computed modification detection code of said third program is equal to said second code value stored in said second program and to cause execution of said third program loaded into said random access memory if said computed modification detection code of said third program is equal to said second code value; and means to halt operation of the computer system if said computed modification code of said third program is not equal to said second code value.

4. The computer system of claim 3, wherein said storage means stores a fourth program to be executed by said processor and wherein said third program includes:

means to store a third code value being a modification detection code of said fourth program;

means to load said fourth program into said random access memory;

means to compute the modification detection code of said fourth program loaded into said random access memory;

means to determine if said computed modification detection code of said fourth program is equal to said third code value stored in said third program and to cause execution of said fourth program loaded into said random access memory if said computed modification detection code of said fourth program is equal to said third code value; and means to halt operation of the computer system if said computed modification code of said fourth program is not equal to said third code value.

5. The computer system of claim 14, wherein said storage means stores a fourth program to be executed by said processor and wherein said second program further includes:

means to store a third code value being a modification detection code of said fourth program;

means to load said fourth program into said random access memory;

means to compute the modification detection code of said fourth program loaded into said random access memory;

means to determine if said computed modification detection code of said fourth program is equal to said third code value stored in said second program and to cause execution of said fourth program loaded into said random access memory if said computed modification detection code of said fourth program is equal to said third code value; and means to halt operation of the computer system if said computed modification code of said fourth program is not equal to said third code value.

6. A computer system comprising: a processor; random access memory;

read only memory containing a first program executed by said processor upon resetting of the computer system;

first storage means for storing first operating system and user programs executed by said processor, said first storage means including a region for storing a second program loaded and executed by said processor; and a non-volatile memory device having a location for storing a first code value and accessible to said processor, said first code value being a modification detection code of said second program, said location being readable and writable by said processor after a first reset of the computer system, being write protected after receipt of a designated signal from said processor and being made writable again only after a second reset of the computer system, wherein said first program includes:
means to determine if said second program is present and to load said second program into said random access memory if said second program is present;

means to compute the modification detection code of said second program loaded into said random access memory;

means to determine if said computed modification code of said second program is equal to said first code value stored in said non-volatile memory device, to provide said designated signal to said non-volatile memory device if said computed modification detection code of said second program is equal to said first code value and to cause execution of said second program loaded into said random access memory after providing said designated signal; and means to prevent execution of said second program if said computed modification code of said second program is not equal to said first code value.

7. The computer system of claim 6, wherein said non-volatile memory includes a second code value and wherein said first program further includes:

means for determining if information providing said second code value is present and for booting the computer system without providing said designated signal to said non-volatile memory device if said second code value is present.

8. The computer system of claim 7, wherein a third program is present and said means for determining if information providing said second code value is present includes:

means for loading said third program;

means to compute the modification detection code of said third program loaded into said random access memory;

means to determine if said computed modification detection code of said third program is equal to said second code value stored in said non-volatile memory device and to cause execution of said third program loaded into said random access memory without providing said designated signal to said non-volatile memory device if said computed modification detection code of said third program is equal to said second code value.

9. A computer system comprising:

a processor;

random access memory;

read only memory containing a first program executed by said processor upon resetting of the computer system;

first storage means for storing a plurality of programs executed by said processor, said plurality of programs including second, third and fourth programs;

a non-volatile memory device having a location for storing a first code value and accessible to said processor, said first code value being a modification detection code of said third program, said location being readable and writable by said processor after a first reset of the computer system, being write protected after receipt of a designated signal from said processor and being made writable again only after a second reset of the computer system; and means for controlling loading of said plurality of programs so that said second program is loaded and executed before said fourth program is loaded and executed, wherein said second program includes:

means for storing a first identification sequence;

means to receive an identification sequence;

means to determine if said received identification sequence is equal to said first stored identification sequence and to complete operation of said second program without providing said designated signal to said non-volatile memory device if said received identification sequence is equal to said first stored identification sequence before completing operation of said second program; and means to determine if said received identification sequence is not equal to said first stored identification sequence and to provide said designated signal to said non-volatile memory device if said received identification sequence is not equal to said first stored identification sequence before completing operation of said second program;

wherein said third program includes:

means to load one of a plurality of said plurality of programs into said random access memory, said plurality of said plurality of programs including said second program;

means for storing a modification detection code for said one of a plurality of programs loaded into said random access memory;

means to compute the modification detection code of said one of a plurality of programs loaded into said random access memory;

means to determine if said computed modification code of said one of a plurality of programs is equal to said stored modification code and to cause execution of said one of a plurality of programs loaded into said random access memory if said computed modification detection code of said one of a plurality of programs is equal to said stored modification code without providing said designated signal to said non-volatile memory device; and means to prevent execution of said one of a plurality of programs if said computed modification code of said one of a plurality of programs is not equal to said stored modification code, wherein said fourth program is a program other than said plurality of programs having modification detection codes stored by said third program, and wherein said first program includes:

means to load said third program into said random access memory;

means to compute the modification detection code of said third program loaded into said random access memory;

means to determine if said computed modification code of said third program is equal to said first code value stored in said non-volatile memory device and to cause execution of said third program loaded into said random access memory if said computed modification detection code of said third program is equal without providing said designated signal to said non-volatile memory device; and means to prevent execution of said third program if said computed modification code of said third program is not equal to said first code value.

10. The computer system of claim 9, wherein said identification sequence of said second program is a password entered by a user and said means for receiving an identification sequence interacts with said user.

11. A method for operating a computer system, the computer system including a processor; random access memory; read only memory containing a first program executed by said processor upon resetting of the computer system; first storage means for storing first operating system and user programs executed by said processor, said first storage means including a region for storing a second program loaded and executed by said processor to commence booting the computer system from said first storage means; second storage means for storing second operating system and user programs executed by said processor, said second storage means including a region for storing a third program loaded and executed by said processor to commence booting the computer system from said second storage means; and a non-volatile memory device having locations for storing first and second code values and accessible to said processor, said first code value being a modification detection code of said second program and said second code value being a modification detection code of said third program, said locations being readable and writable by said processor after a first reset of the computer system, being write protected after receipt of a designated signal from said processor and being made writable again only after a second reset of the computer system, the method comprising the steps of:

resetting the computer system and executing the first program, whereupon the first program causes execution of the following steps:

determining if either of said second or third programs is present and loading said second or third program into said random access memory;

computing the modification detection code of the program loaded into said random access memory;

determining if said computed modification code is equal to said first code value stored in said non volatile memory device;

providing said designated signal to said non-volatile memory device if said computed modification detection code is equal to said first code value;

executing the program loaded into said random access memory after providing said designated signal;

determining if said computed modification detection code is equal to said second code value stored in said non-volatile memory device;

executing the program loaded into said random access memory without providing said designated signal to said non-volatile memory device if said computed modification detection code is equal to said second code value; and halting operation of the computer system if said computed modification code is not equal to either said first code value or said second code value.

12. A method for operating a computer system, the computer system including a processor; random access memory; read only memory containing a first program executed by said processor upon resetting of the computer system; storage means for storing second and third programs to be executed by said processor; and a non-volatile memory device having a first code value and accessible to said processor, said first code value being a modification detection code of said second program, said location being readable and writable by said processor after a first reset of the computer system, being write protected after receipt of a designated signal from said processor and being made writable again only after a second reset of the computer system, the method comprising the steps of:

resetting the computer system and executing the first program, whereupon the first program causes execution of the following steps:

loading said second program into said random access memory;

computing the modification detection code of said second program loaded into said random access memory;

determining if said computed modification detection code of said second program is equal to said code value stored in said non-volatile memory device;

providing said designated signal to said non-volatile memory device if said computed modification detection code of said second program is equal to said code value;

executing said second program loaded into said random access memory after providing said designated signal; and halting operation of the computer system if said computed modification code of said second program is not equal to said first code value, and whereupon the second program causes execution of the following steps:

loading said third program into said random access memory;

computing the modification detection code of said third program loaded into said random access memory;

determining if said computed modification detection code of said third program is equal to a second code value stored in said second program;

executing said third program loaded into said random access memory if said computed modification detection code of said third program is equal to said second code value; and halting operation of the computer system if said computed modification code of said third program is not equal to said second code value.

13. The method of claim 12, wherein said storage means stores a fourth program to be executed by said processor and said first program further causes execution of the following steps:

loading said fourth program into said random access memory;

computing the modification detection code of said fourth program loaded into said random access memory;

determining if said computed modification detection code of said fourth program is equal to a third code value stored in said third program;

executing said fourth program loaded into said random access memory if said computed modification detection code of said fourth program is equal to said third code value; and halting operation of the computer system if said computed modification code of said fourth program is not equal to said third code value.

14. The method of claim 12, wherein said storage means stores a fourth program to be executed by said processor and wherein said second program further causes execution of the following steps:

loading said fourth program into said random access memory;

computing the modification detection code of said fourth program loaded into said random access memory;

determining if said computed modification detection code of said fourth program is equal to a third code value stored in said second program;

executing said fourth program loaded into said random access memory if said computed modification detection code of said fourth program is equal to said third code value; and halting operation of the computer system if said computed modification code of said fourth program is not equal to said third code value.

15. A method for operating a computer system, the computer system including a processor; random access memory; read only memory containing a first program executed by said processor upon resetting of the computer system; first storage means for storing first operating system and user programs executed by said processor, said first storage means including a region for storing a second program loaded and executed by said processor; and a non-volatile memory device having a location for storing a first code value and accessible to said processor, said first code value being a modification detection code of said second program, said location being readable and writable by said processor after a first reset of the computer system, being write protected after receipt of a designated signal from said processor and being made writable again only after a second reset of the computer system, the method comprising the steps of:

resetting the computer system and executing the first program, whereupon the first program causes execution of the following steps:

determining if said second program is present and loading said second program into said random access memory if present;

computing the modification detection code of said second program loaded into said random access memory;

determining if said computed modification code of said second program is equal to said first code value stored in said non-volatile memory device;

providing said designated signal to said non-volatile memory device if said computed modification detection code of said second program is equal to said first code value;

executing said second program loaded into said random access memory after providing said designated signal; and preventing execution of the second program if said computed modification code of said second program is not equal to said first code value.

16. The method of claim 15, wherein said non-volatile memory includes a second code value and wherein said first program further causes the execution of the following steps:

determining if information providing said second code value is present;

booting the computer system without providing said designated signal to said non-volatile memory device if said second code value is present.

17. The method of claim 16, wherein a third program is present and said step of determining if information providing said second code value is present includes:

loading said third program into said random access memory;

computing the modification detection code of said third program loaded into said random access memory;

determining if said computed modification detection code of said third program is equal to said second code value stored in said non-volatile memory device and causing execution of said third program loaded into said random access memory without providing said designated signal to said non-volatile memory device if said computed modification detection code of said third program is equal to said second code value.

18. A method for operating a computer system, the computer system including a processor; random access memory; read only memory containing a first program executed by said processor upon resetting of the computer system; first storage means for storing a plurality of programs executed by said processor, said plurality of programs including second, third and fourth programs; and a non-volatile memory device having a location for storing a first code value and accessible to said processor, said first code value being a modification detection code of said third program, said location being readable and writable by said processor after a first reset of the computer system, being write protected after receipt of a designated signal from said processor and being made writable again only after a second reset of the computer system, the method comprising the steps of:

resetting the computer system and executing the first program;

said second program causing the execution of the following steps on the computer system:
  receiving an identification sequence;
  determining if said received identification sequence is equal to a first identification sequence and to provide said designated signal to said non-volatile memory device if said received identification sequence is equal to said first identification sequence before completing execution of said second program; and
  determining if said received identification sequence is equal to a second identification sequence and to complete execution of said second program without providing said designated signal to said non volatile memory device if said received identification sequence is equal to said second identification sequence before completing execution of said second program;

said third program causing execution of the following steps on the computer system:
  loading one of a plurality of said plurality of programs into said random access memory, said plurality of said plurality of programs including said second program;
  computing the modification detection code of said one of a plurality of programs loaded into said random access memory;
  determining if said computed modification code of said one of a plurality of programs is equal to a stored modification code of said one of a plurality of programs and causing execution of said one of a plurality of programs loaded into said random access memory if said computed modification detection code of said one of a plurality of programs is equal to said stored modification code without providing said designated signal to said non-volatile memory device; and
  preventing execution of said one of a plurality of programs if said computed modification code of said one of a plurality of programs is not equal to said stored modification code;

said first program causing execution of the following steps on the computer system:
  loading said third program into said random access memory;
  computing the modification detection code of said third program loaded into said random access memory;
  determining if said computed modification code of said third program is equal to said first code value stored in said non-volatile memory device;
  executing said third program loaded into said random access memory if said computed modification detection code of said third program is equal without providing said designated signal to said non-volatile memory device; and
  preventing execution of said third program if said computed modification code of said third program is not equal to said first code value; and
  controlling loading of said plurality of programs so that said second program is loaded and executed before said fourth program is loaded and executed, wherein said fourth program is a program other than said plurality of programs having modification detection codes stored by said third program.

19. The method of claim 18, wherein said identification sequence of said second program is a password entered by a user and said step of receiving an identification sequence interacts with said user.

* * * * *

UNITED STATES PATENT AND TRADEMARK OFFICE
CERTIFICATE OF CORRECTION

PATENT NO. :     5,421,006

DATED      :     May 30, 1995

INVENTOR(S) :    David P. Jablon et al.

It is certified that error appears in the above-identified patent and that said Letters Patent is hereby corrected as shown below:

In col. 25, line 7, please replace "14" with --3--.

In col. 25, line 30, "a processor;" should be on a separate line.

In col. 31, line 37, please replace "non volatile" with --non-volatile--.

Signed and Sealed this

Thirty-first Day of October 1995

Attest:

BRUCE LEHMAN

*Attesting Officer*         *Commissioner of Patents and Trademarks*